US012665963B2

(12) United States Patent
 Jin et al.

(10) Patent No.: US 12,665,963 B2
(45) Date of Patent: *\*Jun. 23, 2026*

(54) BACKLIGHT MODULE AND DISPLAY DEVICE

(71) Applicant: WUHAN CHINA STAR OPTOELECTRONICS TECHNOLOGY CO., LTD., Wuhan (CN)

(72) Inventors: Fubao Jin, Wuhan (CN); Chaojun Xing, Wuhan (CN); Suimang Song, Wuhan (CN)

(73) Assignee: WUHAN CHINA STAR OPTOELECTRONICS TECHNOLOGY CO., LTD., Wuhan (CN)

(\*) Notice: Subject to any disclaimer, the term of this patent is extended or adjusted under 35 U.S.C. 154(b) by 0 days.

This patent is subject to a terminal disclaimer.

(21) Appl. No.: 19/074,132

(22) Filed: Mar. 7, 2025

(65) Prior Publication Data

US 2025/0211664 A1     Jun. 26, 2025

Related U.S. Application Data

(63) Continuation of application No. 18/510,601, filed on Nov. 15, 2023, now Pat. No. 12,267,448, which is a
(Continued)

(30) Foreign Application Priority Data

Feb. 8, 2023     (CN) .......................... 202310115204.9

(51) Int. Cl.
 *H04M 1/02* (2006.01)
 *F21V 8/00* (2006.01)

(52) U.S. Cl.
 CPC ........ *H04M 1/0264* (2013.01); *G02B 6/0088* (2013.01)

(58) Field of Classification Search
 CPC .......................... G02B 6/0088; H04M 1/0264
 See application file for complete search history.

(56) References Cited

U.S. PATENT DOCUMENTS

2020/0186688 A1\*  6/2020  Chen ...................... H04N 23/54
2020/0267293 A1   8/2020  Noh et al.
(Continued)

FOREIGN PATENT DOCUMENTS

CN      102086993 A     6/2011
CN      102402065 A     4/2012
(Continued)

OTHER PUBLICATIONS

International Search Report in International application No. PCT/CN2023/104783, mailed on Oct. 15, 2023, pp. 1-4, with English translation provided.
(Continued)

*Primary Examiner* — Keith G. Delahoussaye
(74) *Attorney, Agent, or Firm* — HSML P.C.

(57)     ABSTRACT

Provided are a backlight module and a display device. The backlight module includes a fixing member and a sealing member. The fixing member includes a side portion, and the side portion includes an opening. At least part of the sealing member is connected between a display panel and the side portion. The sealing member includes a mounting groove, the mounting groove includes a groove wall and a projection on the groove wall, and the projection is disposed in the opening.

19 Claims, 4 Drawing Sheets

Related U.S. Application Data continuation of application No. PCT/CN2023/104783, filed on Jun. 30, 2023.

(56) References Cited

U.S. PATENT DOCUMENTS

| | | | |
|---|---|---|---|
| 2021/0405446 A1 * | 12/2021 | Yu | G02F 1/133331 |
| 2022/0026771 A1 * | 1/2022 | Yan | G02B 6/0088 |
| 2022/0171120 A1 * | 6/2022 | Cai | G02F 1/133608 |

FOREIGN PATENT DOCUMENTS

| | | | | |
|---|---|---|---|---|
| CN | 109459880 A | | 3/2019 | |
| CN | 110737131 A | * | 1/2020 | G02F 1/133608 |
| CN | 110796954 A | | 2/2020 | |
| CN | 110890023 A | | 3/2020 | |
| CN | 111399281 A | | 7/2020 | |
| CN | 113641040 A | | 11/2021 | |
| CN | 115202091 A | | 10/2022 | |

OTHER PUBLICATIONS

Written Opinion of the International Search Authority in International application No. PCT/CN2023/104783, mailed on Oct. 15, 2023, pp. 1-3, with English translation provided.

Chinese Office Action issued in corresponding Chinese Patent Application No. 202310115204.9 mailed on Jan. 13, 2025, pp. 1-6, with English translation provided.

Chinese Office Action issued in corresponding Chinese Patent Application No. 202310115204.9 mailed on Mar. 18, 2025, pp. 1-4, with English translation provided.

* cited by examiner

BACKLIGHT MODULE AND DISPLAY DEVICE

CROSS-REFERENCE TO RELATED APPLICATION

This is a Continuation Application of U.S. patent application Ser. No. 18/510,601 which is a continuation of International Patent Application No. PCT/CN2023/104783, filed on Jun. 30, 2023, which claims priority to Chinese Patent Application No. 202310115204.9 filed with the China National Intellectual Property Administration (CNIPA) on Feb. 8, 2023, disclosures of which are incorporated by reference in their entireties.

TECHNICAL FIELD

The present disclosure relates to design and manufacture of display panels, and more particularly, to a backlight module and a display device.

BACKGROUND

With the development of preparation technology of display panels, higher requirements for the display effect and comprehensive performance of the display panels and display devices are put forward by people.

Electronic apparatuses with high screen ratios have larger display areas, therefore, a better user experience can be provided for users. In the related art, a higher screen ratio is achieved by providing an opening hole in a specific area on a screen of a display panel and correspondingly installing a camera module. To reduce the influence of the opening hole on a display area of the display panel as much as possible, a diameter of the opening hole is usually made smaller and the camera module is placed under the corresponding opening hole. Alternatively, an opening hole is arranged in a backlight module below the display panel, and a camera assembly is placed in the opening hole. However, in the above design, when the opening hole is directly provided in the display panel, it will damage the display panel, which is not conducive to the realization of a full screen; and when the opening hole is provided in the backlight module below the display panel, in the actual production process, external dust will enter the backlight module through the opening hole, in addition, when the display panel is displaying normally, the light inside the display panel will enter the camera assembly through a gap at an edge of the opening hole, which will further interfere with the imaging of the camera assembly, and it is not conducive to further improvement of the comprehensive performance of the display panel.

Therefore, it is necessary to propose solutions to the problems in the related art.

SUMMARY

Some embodiments of the present disclosure provide a backlight module. The backlight module is disposed on a side of a display panel facing away from a light-emitting side of the display panel, and includes a through hole for receiving light. The backlight module includes a fixing member and a sealing member. The fixing member includes a side portion, where at least part of the side portion is disposed in the through hole, and the side portion includes an opening. At least part of the sealing member is connected between the display panel and the side portion, where the sealing member includes a mounting groove, the mounting groove includes a groove wall and a projection on the groove wall, and the projection is disposed in the opening.

Some embodiments of the present disclosure provide a display device. The display device includes a display panel and a backlight module. The backlight module is disposed on a side of the display panel facing away from a light-emitting side of the display panel, and includes a through hole for receiving light. The backlight module includes a fixing member and a sealing member. The fixing member includes a side portion, where at least part of the side portion is disposed in the through hole, and the side portion includes an opening. At least part of the sealing member is connected between the display panel and the side portion, where the sealing member includes a mounting groove, the mounting groove includes a groove wall and a projection on the groove wall, and the projection is disposed in the opening.

DETAILED DESCRIPTION

The following various embodiment are described with reference to accompanying drawings, to illustrate specific implementations, which can be achieved by the present disclosure.

With the continuous development of preparation technologies of display panels, higher requirements for the performance and display effect of the display panels and display devices are put forward by people.

In the related art, a blind-hole type opening structure is usually disposed in a backlight module, and a camera module is arranged below a display screen, so as to realize a full-screen display effect. However, when the opening structure is manufactured, external light and dust can easily enter a camera assembly through an edge area of the opening structure, and at the same time, the opening structure will also affect entry of light and reduce the sealing and imaging effect of a corresponding display device, which is not conducive to further improvement of the comprehensive performance of the display device.

Embodiments of the present disclosure provide a backlight module, a display device, and an electronic apparatus, which can effectively improve the adverse influence of the corresponding opening structure above the camera module on the display device in the related art, and effectively improve the sealing and imaging effects of the display device.

Figure 1:
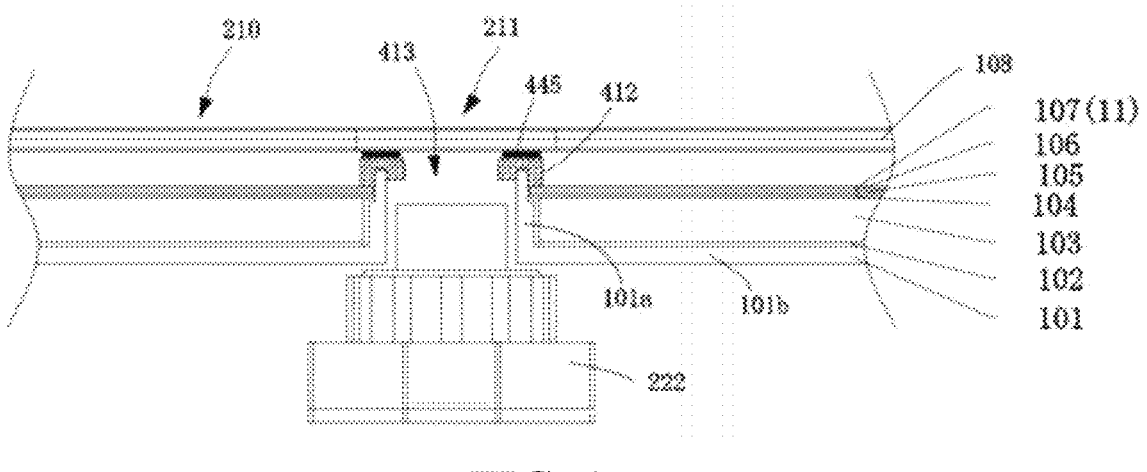
FIG. 1 illustrates a schematic view of a film-layer structure of a display device provided by an embodiment of the present disclosure.

As shown in FIG. 1, FIG. 1 illustrates a schematic view of a film-layer structure of a display device provided by an embodiment of the present disclosure. The display device includes a display panel 108 and a backlight module 11.

Specifically, the display panel 108 and the backlight module 11 are disposed in a stacked manner, for example, the backlight module 11 is disposed on a side of the display panel 108 facing away from a light-emitting side of the display panel 108, i.e., the backlight module 11 is disposed on a back side of the display panel 108.

In this embodiment, the backlight module 11 further includes an optical component, a sealing member 412, and a fixing member 101.

The sealing member 412 is disposed on a side of the backlight module 11 facing towards the display panel 108, and the fixing member 101 is disposed on a side of the backlight module 11 facing away from the display panel 108. In this embodiment, an end of the sealing member 412 is connected to the display panel 108, and another end of the sealing member 412 is disposed on the backlight module 11, such as on the optical component. In an embodiment, the optical component can include a stacked structure with multiple films, so as to support the display panel 108 and the backlight module 11.

Due to the arrangement of the sealing member 412, there will be a certain gap between the backlight module 11 and the display panel 108. In an embodiment of the present disclosure, a height of the gap is set to be less than 1.3 millimeters (mm), and optionally, the height of the gap is set to be 1 mm, 1.1 mm, or is set according to an actual product.

Further, the display panel 108 also includes a display area 210 and an imaging area 211. The display area 210 is configured for normal display of the display panel 108, and the display area 210 is disposed around the imaging area 211, as such, when a user observes the display panel 108, a surface of the display panel 108 is a complete surface, and the display effect of full screen can be achieved.

Meanwhile, a through hole 413 is defined in the backlight module at a position of the backlight module corresponding to the imaging area 211. Specifically, the through hole 413 passes through the backlight module 11, for example, the through hole is disposed on the optical component. At the same time, a camera assembly 222 is correspondingly arranged in the through hole 413. When the camera assembly 222 works normally, light enters the camera assembly 222 from the through hole and realizes shooting function.

In the embodiment of the present disclosure, the fixing member 101 is disposed at a side of the backlight module 11 facing away from the display panel 108. The fixing member 101 can be attached to the backlight module 11 to support and fix the backlight module 11. At the same time, the fixing member 101 extends into the through hole 413 and is connected to the sealing member 412, so that the fixing member 101 and the sealing member 412 can together form an integral structure. When the display panel 108 works normally, the sealing member 412 can effectively block surrounding light and seal the through hole 413, thereby effectively avoiding the problem that external dust entering the inside of the backlight module 11 results in the device performance degradation.

In the embodiment of the present disclosure, when the fixing member 101 is disposed, the fixing member 101 includes a side portion 101a and a bottom portion 101b. Specifically, the bottom portion 101b is disposed on a side of the optical component facing away from the display panel 108, and at least part of the side portion 101a is disposed in the through hole 413. At the same time, an end of the side portion 101a facing towards the display panel 108 is clamped and fixed with the sealing member 412.

Further, in an embodiment of the present disclosure, when the backlight module 11 is disposed, the optical component of the backlight module 11 may include an upper diffusion film 107, a double brightness enhancing film (DBEF) 106, a brightness enhancing film (BEF) 105, a lower diffusion film 104, a light guide plate 103, and a retroreflective sheet 102.

Specifically, when the above film-layer structure is disposed, the light guide plate 103 is directly disposed on the fixing member 101, the lower diffusion film 104 is disposed on the light guide plate 103, and the BEF 105 is disposed on the light guide plate 103. Further, the DBEF 106 is disposed on the BEF 105, and the upper diffusion film 107 is disposed on the DBEF 106. When the display panel 108 works normally, above different functional film layers can effectively ensure the normal operation of the display panel 108.

In an embodiment of the present disclosure, an end of the sealing member 412 is directly in contact with the upper diffusion film 107 and is fixedly connected and supported. Further, the backlight module 11 may be provided with other film layers, which will not be described herein.

Figure 2:
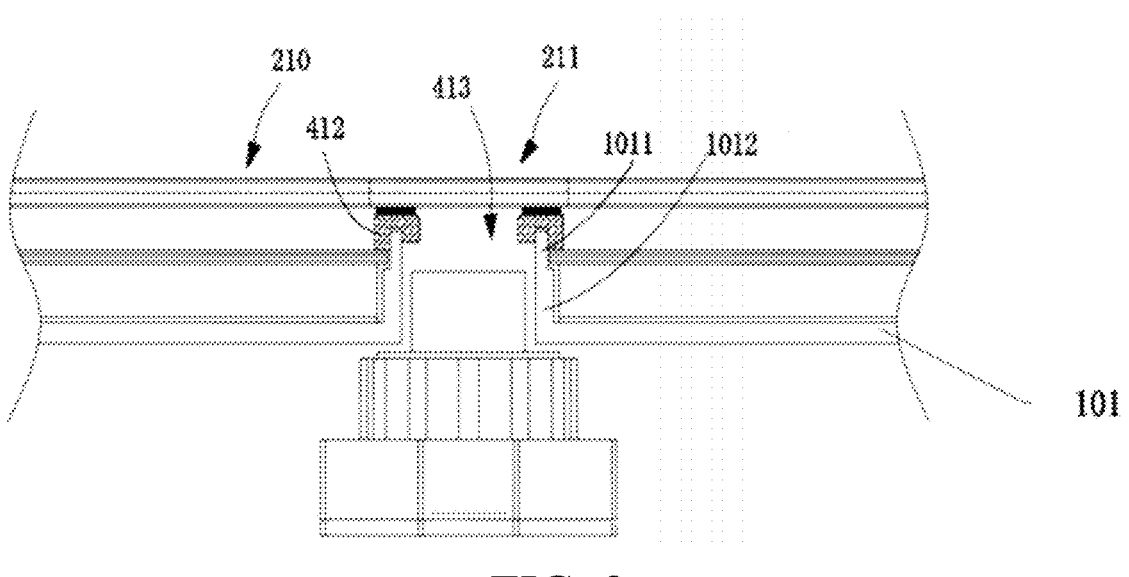
FIG. 2 illustrates a schematic structural view of another display device provided by an embodiment of the present disclosure.

As shown in FIG. 2, FIG. 2 illustrates a schematic structural diagram of another display device provided by an embodiment of the present disclosure. Combined with the structure in FIG. 1, in the embodiment of the present disclosure, the side portion 101a of the fixing member 101 further includes at least a first extension part 1011 and a second extension part 1012, and the first extension part 1011 and the second extension part 1012 extend into the through hole 413. The first extension part 1011 and the second extension part 1012 are disposed around an inner wall of the through hole 413. At the same time, the first extension part 1011 is disposed at a side of the side portion 101a facing towards the sealing member 412, and the second extension part 1012 is disposed at a side of the side portion 101a facing away from the sealing member 412. The first extension part 1011 is connected to the second extension part 1012, and the first extension part 1011 is clamped with the sealing member 412, such that the sealing member 412 and the fixing member 101 together form an integral structure and are used to seal the through hole 413.

In an embodiment of the present disclosure, when the sealing member 412 is connected to the fixing member 101, the first extension part 1011 can be directly clamped into the sealing member 412, thereby ensuring better sealing performance.

Further, a thickness of the first extension part 1011 can be smaller than that of the second extension part 1012, such that the first extension part 1011 can be better engaged with the sealing member 412 and the problem of mutual interference between the first extension part 1011 and other film layers can be avoided.

In an embodiment of the present disclosure, when the corresponding extension parts of the fixing member 101 are arranged, cross sections of sides of the corresponding extension parts facing towards the through hole 413 are defined as flat surfaces, and at the same time, sections of sides of the corresponding extension parts facing away from the through hole 413 are defined as step surfaces, so that the extension parts are disposed to have different thicknesses at different positions.

Figure 3:
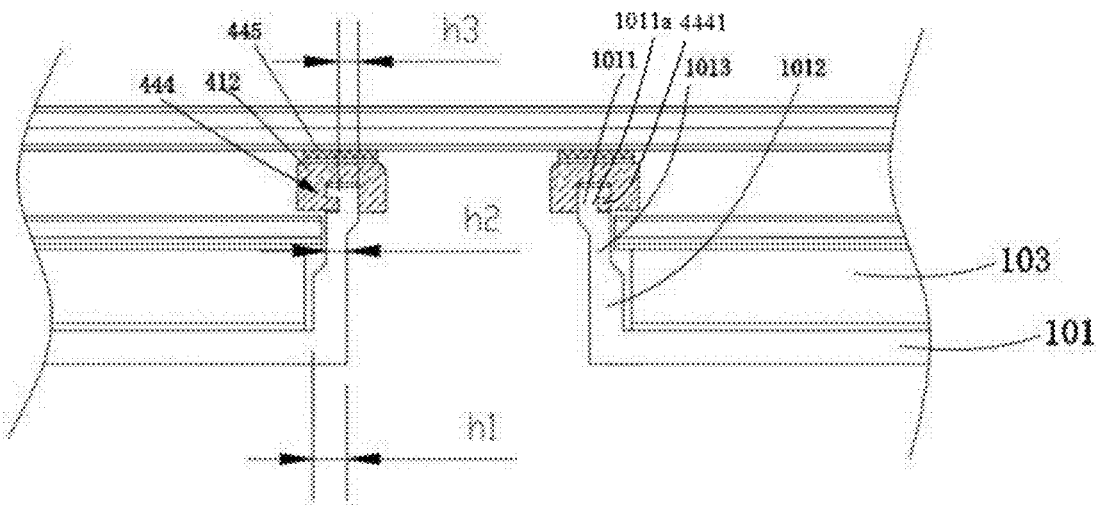
FIG. 3 illustrates a schematic diagram of a partial film-layer structure of a display device provided by an embodiment of the present disclosure.

As shown in FIG. 3, FIG. 3 illustrates a schematic view of a partial film-layer structure of a display device provided by an embodiment of the present disclosure. Combined with the structure in FIG. 1, see FIG. 3 for details, in the embodiment of the present disclosure, when the fixing member 101 is disposed, the extension parts of the fixing member 101 may further include a third extension part 1013.

The third extension part 1013 can be correspondingly disposed between the first extension part 1011 and the second extension part 1012. Meanwhile, sides surfaces of the third extension part 1013, the second extension part 1012 and the first extension part 1011 facing away from the through hole 413 are defined as a step surface structure.

Specifically, the thickness of the first extension part 1011 is h3, the thickness of the second extension part 1012 is h1, and a thickness of the third extension part 1013 is h2. In an embodiment of the present disclosure, the h2 may be equal to h3, and at the same time, the h2 is smaller than the thickness h1, that is to say, h1>h2=h3. In the embodiment of the present disclosure, film layers at different positions are disposed to have different thicknesses, thereby effectively ensuring the relative relationship between the extension parts and other film layers and ensuring the performance of the display device. At the same time, in the embodiment of the present disclosure, under the condition of ensuring sufficient supporting strength, a smaller opening diameter can be realized, so that the effect of weakening of non-display area of a camera is hidden, and the imaging effect of the display device is improved.

Further, when the first extension part 1011, the second extension part 1012 and the third extension part 1013 are arranged, the second extension part 1012 is correspondingly disposed in a corresponding region of the light guide plate 103, and the third extension part 1013 is correspondingly disposed at a position between the sealing member 412 and the light guide plate 103. At the same time, the first extension part 1011 is at least arranged inside the sealing member 412.

Further, a gap between the second extension part 1012 and the light guide plate 103 may be greater than a gap between the third extension part 1013 and the corresponding film layer of the third extension part 1013, thereby ensuring that the display device has a good sealing effect. In an embodiment of the present disclosure, the gap between the third extension part 1013 and the corresponding film layer of the third extension part 1013 can be set to 0.1 mm, thereby ensuring that the problem of mutual interference does not occur during the installation process and improving the installation efficiency.

Moreover, when the sealing member 412 is provided, the sealing member 412 further includes a mounting groove 444. Specifically, the mounting groove 444 is disposed on a side surface of the sealing member 412 facing towards the backlight module. During installation, the first extension part 1011 is inserted into the mounting groove 444 and fixed in the mounting groove 444.

Figure 4:
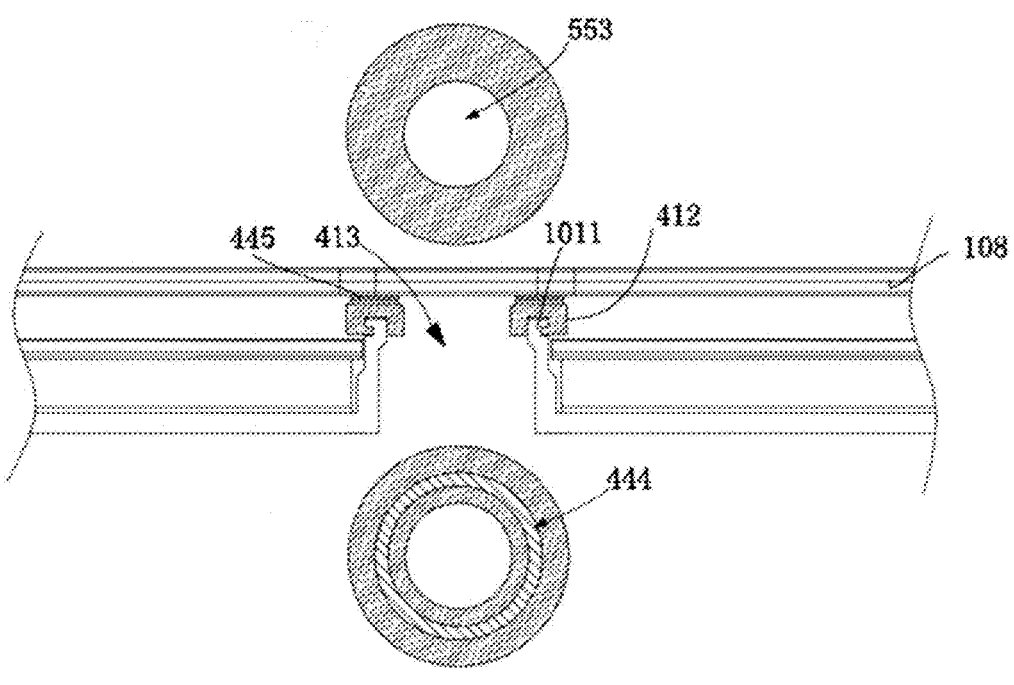
FIG. 4 illustrates a schematic structural view of a sealing member provided by an embodiment of the present disclosure.

As shown in FIG. 4, FIG. 4 illustrates a schematic structural view of a sealing member provided by an embodiment of the present disclosure. In combination with the structure in FIG. 3, an upper surface of the sealing member 412 proximate to the display panel 108 is defined as a flat surface, such as a complete horizontal plane. Meanwhile, a mounting groove 444 is formed on a lower surface of the sealing member 412 facing away from the display panel 108.

In an embodiment of the present disclosure, when the mounting groove 444 is disposed, a connecting portion may be also disposed in the mounting groove 444. Specifically, the connecting portion can be defined as a thread or a clamping groove, and the tight connection can be realized through the thread or the clamping groove. At the same time, when the above thread or the clamping groove is disposed, the thread and clamping groove can be disposed on inner side walls of different sides of the mounting slot 444, such that different connection effects between fasteners can be achieved. Specifically, the thread or the clamping groove can be disposed on an inner wall of a side of the mounting groove 444 facing towards a central axis of the through hole 413, or the thread or the clamping groove can be disposed on an inner wall of the mounting groove 444 facing away from the central axis of the through hole 413.

In an embodiment of the present disclosure, the sealing member 412 is disposed around the through hole 413, and a side edge of the sealing member 412 protrudes from an edge of the through hole 413, thereby better sealing the through hole 413.

Further, the sealing member 412 further includes an opening hole 553, which is disposed to correspond to the through hole 413, and an aperture of the opening hole 553 is smaller than that of the through hole 413, as such, it is ensured that different components have better connection effect when being connected.

In an embodiment of the present disclosure, the sealing member 412 can be made of elastic material, such as silicone rubber material or other materials with certain elasticity. Therefore, when the display device is subjected to an external force, the sealing member 412 can act a buffer function to a certain extent, thereby ensuring the performance of the display device.

Further, the upper surface of the sealing member 412 is defined as a flat surface, and at the same time, an adhesive 445 is disposed between the display panel 108 and the sealing member 412. The adhesive 445 is used to closely adhere the sealing member 412 to the display panel 108 to prevent dust outside the sealing member 412 from entering the through hole 413. In an embodiment, the adhesive 445 can be set as a black adhesive layer.

In the following embodiments, the sealing member 412 is illustrated by taking a hollow cylindrical structure as an example. When the mounting groove 444 is disposed, the mounting groove 444 can be disposed around the opening hole 553, for example, the mounting groove 444 and the opening hole 553 are concentric circle structures. During installation, the first extension part 1011 in the embodiment of the present disclosure is correspondingly installed into the opening hole 553 and fixed in the opening hole 553.

Figure 5:
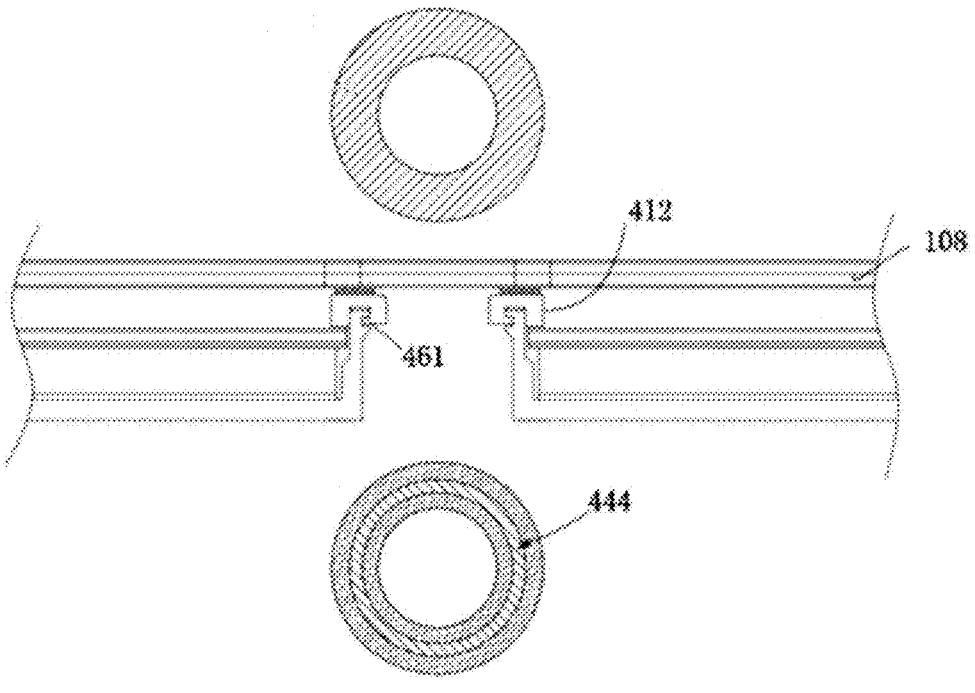
FIG. 5 illustrates a schematic structural view of another sealing member in an embodiment of the present disclosure.

As shown in FIG. 5, FIG. 5 illustrates a schematic structural view of another sealing member in an embodiment of the present disclosure. Combined with the structure in FIG. 4, in the embodiment of the present disclosure, when the mounting groove 444 in the sealing member 412 is disposed, a protrusion 461 is disposed in a horizontal direction corresponding to the mounting groove 444, and the protrusion 461 divides the mounting groove 444 into two different widths. Correspondingly, the first extension part 1011 is provided with a clamping groove corresponding to the protrusion 461. During installation, the clamping groove on the first extension part 1011 is correspondingly nested on the protrusion 461, and tight engagement is realized, so that the sealing member 412 is connected and fixed with the first extension part 1011.

In an embodiment, in order to ensure the connection effect between the first extension part 1011 and the sealing member 412, the first extension part 1011 and the mounting groove 444 on the sealing member 412 may be disposed to have an interference fit relationship. For example, a film-layer thickness of the first extension part 1011 is greater than a width of the mounting groove 444, thereby ensuring the connection effect between the first extension part 1011 and the mounting groove 444.

Figure 6:
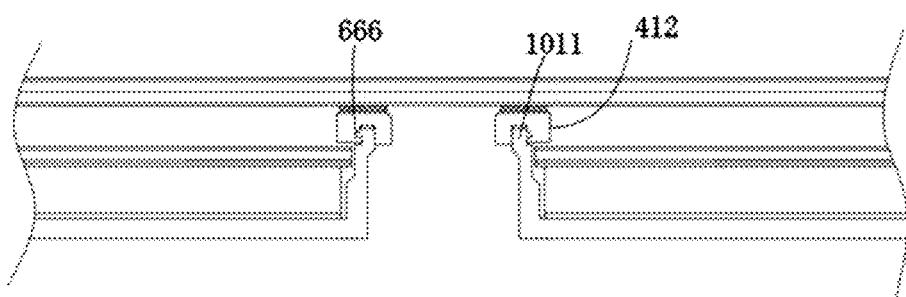
FIGS. 6-8 illustrate schematic structural views of connection structures of a sealing member and a fixing member in embodiments of the present disclosure.
Figure 7:
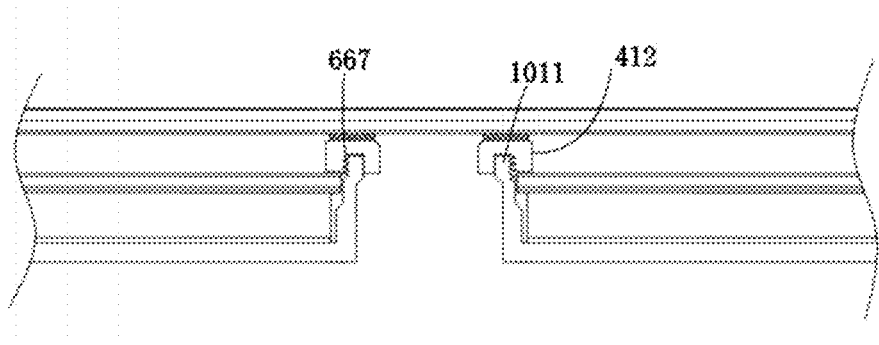
Figure 8:
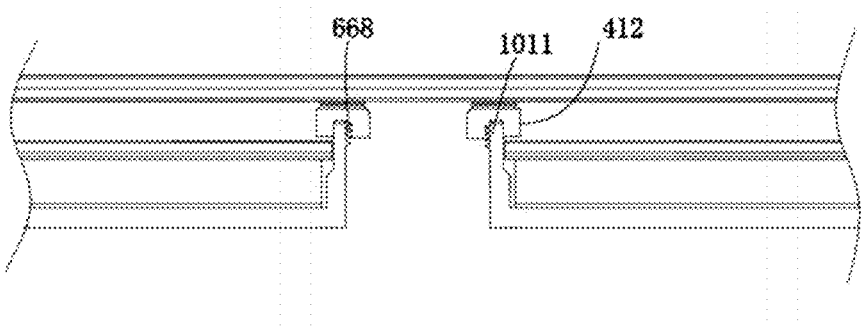

Further, as shown in FIG. 6 to FIG. 8, FIG. 6 to FIG. 8 illustrate schematic structural views of connection structures of a sealing member and a fixing member in embodiments of the present disclosure. In embodiments of the present disclosure, when the sealing member 412 is connected to the first extension part 1011, the connection structures may be riveting structures, threaded connection structures, insertion connection structures, or direct clamping structures.

See the connection structures in FIG. 6 for details, during the connection, a riveting structure 666 is disposed in the mounting groove 444 in the sealing member 412. This riveting structure 666 can be understood as a clamping groove, and can realize the connection of two different portions through clamping. Correspondingly, the first extension part 1011 is provided with a matching structure, such as a protrusion, that matches with the riveting structure 666. During installation, the protrusion or other mating structure on the first extension part 1011 corresponds to the riveting structure 666 in the mounting groove 444 and thus fixing is achieved. Finally, the sealing member 412 is tightly combined with the first extension part 1011.

In the embodiment of the present disclosure, when the riveting structure 666 in the mounting groove 444 is disposed, a depth of the riveting structure 666 can exceed half of a depth of the mounting groove 444, and at the same time, the riveting structure 666 can be arranged on side walls of different sides in the mounting groove. As such, the close cooperation between the sealing member 412 and the first extension part 1011 is ensured, installation problems such as dislocation when the display device is violently shaken are avoided, and the reliability of the display panel is ensured.

As shown in FIG. 7 for details, in combination with the installation structure in FIG. 6, in an embodiment of the present disclosure, during connection, an external thread structure 667 is provided in the mounting groove 444 of the sealing member 412. Specifically, multiple threads are arranged on a side wall of a side inside the mounting groove 444. At this time, the side wall is the side wall facing away from the central axis of the through hole 413. Correspondingly, on the first extension part 1011, another mating threads matched with the multiple threads are provided, and the another mating threads are provided on a surface of a side of the first extension part 1011 facing away from the through hole 413, so as to realize threaded connection.

During installation, the mating threads on the first extension part 1011 are screwed into the threads in the mounting groove 444 to realize tight thread connection. In an embodiment of the present disclosure, the corresponding structure in the mounting groove 444 can be molded by die casting, or prepared by combining with machining processes such as wire cutting, which will not be described herein.

As shown in FIG. 8, in combination with the connection structures in FIG. 7, in the embodiment of the present disclosure, an internal thread structure 668 is provided in the mounting groove 444 of the sealing member 412. Specifically, corresponding threads of the internal thread structure 668 are arranged on the inner wall of the mounting groove 444 facing towards the through hole 413. In FIG. 7, a thread orientation of the external thread structure 667 is opposite to that of the internal thread structure 668 in FIG. 8. Specifically, at this time, the side wall is the side wall facing towards the central axis of the through hole 413. Correspondingly, on the first extension part 1011, another mating threads matched with the threads, and the another mating threads are provided on a surface of the first extension part 1011 facing towards the through hole 413, so as to realize threaded connection. Furthermore, by arranging screw structures with different orientations in the sealing member 412, the connection effect between different components can be effectively ensured, and external dust can be prevented from entering the module to affect the imaging effect of the camera assembly.

Further, when installing the sealing member 412 and the first extension part 1011, other type of installation structure can be arranged in the mounting groove to ensure the tightness of the connection through the installation structure. In the embodiments of the present disclosure, the fixing member 101 and the sealing member 412 are closely connected, so that different components can interact with each other, and the reliability of the display panel and the display device can be ensured when the display device is under the action of external force.

In an embodiment of the present disclosure, when the sealing member 412 and the corresponding through hole 413 are arranged, a side edge of the sealing member 412 protrudes from an edge of the through hole 413, thereby reducing a aperture of the through hole 413 as much as possible and improving the full-screen display effect of the display panel.

Further, an embodiment of the present disclosure also provides an electronic apparatus. The electronic apparatus includes the display device described in the embodiments of the present disclosure. When the structure in the display device is arranged, it is arranged according to the structure provided in the embodiments of the present disclosure. Therefore, it is ensured that the electronic apparatus has a good full-screen display effect, and at the same time, and also has a high sealing effect and imaging quality, thereby improving the comprehensive performance of the electronic apparatus.

In the embodiment of the present disclosure, the display device and the corresponding electronic apparatus can be any product or component that can display or shoot, such as a mobile phone, a computer, electronic paper, a display, a notebook computer, and a digital photo frame, and the specific types of the display device and the corresponding electronic apparatus are not specifically limited herein.

In summary, the display device and the electronic apparatus provided by embodiments of the present disclosure have been described in detail. The principle and implementations of the present disclosure are explained by using specific embodiments. The description of the above embodiments is merely intended to help understand the technical solutions and core idea of the present disclosure. Although the present disclosure has been disclosed in terms of preferred embodiments, the above preferred embodiments are not intended to limit the present disclosure, and those skilled in the art can make various changes and modifications of the above preferred embodiments without departing from the spirit and the scope of protection of the present disclosure, so the scope of protection of the present disclosure is based on the scope defined by the claims.

Further, some embodiments of the present disclosure provide a backlight module 11. The backlight module 11 is disposed on a side of a display panel 108 facing away from a light-emitting side of the display panel 108, and includes a through hole 413 for receiving light. The backlight module 11 includes a fixing member 101 and a sealing member 412. The fixing member 101 includes a side portion 101a, where at least part of the side portion 101a is disposed in the through hole 413, and the side portion 101a includes an opening 1011a. At least part of the sealing member 412 is connected between the display panel 108 and the side portion 101a. The sealing member 412 includes a mounting groove 444, the mounting groove 444 includes a groove wall and a projection 4441 on the groove wall, and the projection 4441 is disposed in the opening 1011*a*.

The projection 4441 and the opening 1011*a* are shown in FIG. 3.

In some embodiments, the sealing member 412 includes the mounting groove 444, the mounting groove 444 has the projection 4441 protruding from the groove wall of the mounting groove 444, and the projection 4441 is configured to be clamped with the opening 1011*a* of the side portion 101*a* when the end of the side portion 101*a* adjacent to the display panel 108 is received within the mounting groove 444.

Other embodiments of the backlight module 11 can be referred to any suitable embodiment of the present disclosure, e.g., the above-described embodiments of the display device and the electronic apparatus, and these will not be repeated here.

What is claimed is:

1. A display device, comprising:

a display panel; and a backlight module, disposed on a side of the display panel facing away from a light-emitting side of the display panel, and comprising a through hole for receiving light, wherein the backlight module comprises:

a fixing member comprising a side portion, wherein at least part of the side portion is disposed in the through hole, and the side portion comprises an opening; and a sealing member, at least part of the sealing member being connected between the display panel and the side portion, wherein the sealing member comprises a mounting groove, the mounting groove comprises a groove wall and a projection on the groove wall, and the projection is disposed in the opening;

wherein the side portion of the fixing member comprises a first extension part and a second extension part, the first extension part and the second extension part are disposed in the through hole, and a thickness of the first extension part is smaller than a thickness of the second extension part; and wherein the first extension part is disposed proximate to the sealing member and is clamped with the sealing member, and the first extension part comprises the opening of the side portion.

2. A backlight module, disposed on a side of a display panel facing away from a light-emitting side of the display panel, and comprising a through hole for receiving light, wherein the backlight module comprises:

a fixing member comprising a side portion, wherein at least part of the side portion is disposed in the through hole, and the side portion comprises an opening; and a sealing member, at least part of the sealing member being connected between the display panel and the side portion, wherein the sealing member comprises a mounting groove, the mounting groove comprises a groove wall and a projection on the groove wall, and the projection is disposed in the opening;

wherein the side portion of the fixing member comprises a first extension part and a second extension part, the first extension part and the second extension part are disposed in the through hole, and a thickness of the first extension part is smaller than a thickness of the second extension part; and wherein the first extension part is disposed proximate to the sealing member and is clamped with the sealing member, and the first extension part comprises the opening of the side portion.

3. The backlight module according to claim 2, wherein the opening of the side portion is disposed on a side of the side portion facing away from the through hole.

4. The backlight module according to claim 2, wherein the opening of the side portion is disposed on a side of the side portion facing towards the through hole.

5. The backlight module according to claim 2, wherein the sealing member encloses an end of the side portion.

6. The backlight module according to claim 2, wherein a clamping groove is provided in the mounting groove; and the clamping groove is disposed on an inner wall of a side of the mounting groove facing towards a central axis of the through hole; or the clamping groove is disposed on an inner wall of a side of the mounting groove facing away from the central axis of the through hole.

7. The backlight module according to claim 6, wherein a protrusion is formed on the first extension part at a position corresponding to the mounting groove; and the clamping groove in the mounting groove cooperates with and is connected to the protrusion on the first extension part, and the clamping groove is fixed to the protrusion.

8. The backlight module according to claim 2, wherein the thickness of the first extension part is greater than a width of the mounting groove in the sealing member.

9. The backlight module according to claim 2, wherein the side portion further comprises a third extension part, an end of the third extension part is connected to the first extension part, and another end of the third extension part is connected to the second extension part; and at least part of the first extension part is disposed in the sealing member, and a thickness of the third extension part is equal to the thickness of the first extension part.

10. The backlight module according to claim 9, wherein cross sections of sides of the first extension part, the second extension part, and the third extension part facing towards the through hole are defined as flat surfaces, and cross sections of sides of the first extension part, the second extension part, and the third extension part facing away from the through hole are defined as step surfaces.

11. The backlight module according to claim 9, further comprising an optical component, wherein the through hole is provided on the optical component;

wherein a gap between the second extension part and a corresponding film layer of the optical component is greater than a gap between the third extension part and the corresponding film layer of the optical component.

12. The backlight module according to claim 2, wherein an edge of a side of the sealing member is configured to protrude from an edge of the through hole.

13. The backlight module according to claim 2, wherein a surface of the sealing member facing towards the display panel is a flat surface, and the sealing member is formed by an elastic material.

14. The backlight module according to claim 2, further comprising an optical component, wherein the through hole is provided on the optical component.

15. The backlight module according to claim 14, wherein the fixing member further comprises a bottom portion disposed on a side of the optical component facing away from the display panel.

16. The backlight module according to claim 14, wherein the optical component comprises a light guide plate disposed on the fixing member.

17. The backlight module according to claim 16, wherein the optical component further comprises an upper diffusion film disposed above the light guide plate; and an end of the sealing member is in contact with the upper diffusion film and is fixedly connected to the upper diffusion film.

18. The backlight module according to claim 2, wherein the sealing member further comprises an opening hole disposed to correspond to the through hole, and an aperture of the opening hole is smaller than an aperture of the through hole.

19. The backlight module according to claim 18, wherein the sealing member is a hollow cylindrical structure, and the mounting groove of the sealing member and the opening hole are concentric circle structures.

* * * * *